(12) United States Patent
Zi

(10) Patent No.: US 7,782,764 B2
(45) Date of Patent: Aug. 24, 2010

(54) METHOD AND SYSTEM FOR SWITCHING SERVING SERVICES OF THE VIRTUAL PRIVATE LAN SERVICE

(75) Inventor: Kang Zi, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 265 days.

(21) Appl. No.: 11/989,385

(22) PCT Filed: May 26, 2006

(86) PCT No.: PCT/CN2006/001116

§ 371 (c)(1),
(2), (4) Date: Jan. 25, 2008

(87) PCT Pub. No.: WO2007/012239

PCT Pub. Date: Feb. 1, 2007

(65) Prior Publication Data

US 2009/0154339 A1    Jun. 18, 2009

(30) Foreign Application Priority Data

Jul. 28, 2005  (CN) .................... 2005 1 0087291

(51) Int. Cl.
- *H04J 3/14* (2006.01)
- *G06F 11/00* (2006.01)
- *H04L 12/26* (2006.01)
- *H04L 12/28* (2006.01)
- *H04L 12/56* (2006.01)

(52) U.S. Cl. .............. 370/218; 370/225; 370/236.1; 370/244; 370/248; 370/250; 370/351; 370/390; 370/392; 370/395.5; 370/395.53; 370/401; 709/221; 709/242

(58) Field of Classification Search ......... 370/216–218, 370/225, 229, 230, 235, 236, 236.1, 242, 370/244, 245, 248, 250, 254, 255, 351, 390, 370/392, 395.5, 395, 395.53, 401; 709/221, 709/238, 239, 242
See application file for complete search history.

(56) References Cited

U.S. PATENT DOCUMENTS

2003/0031127 A1    2/2003  Saleh et al.

(Continued)

OTHER PUBLICATIONS

Sam Halabi, Publisher: Cisco Press, Pub Date: Oct. 1, 2003, ISBN: 1-58705-096-X, pp. 1, 112-120.*

(Continued)

*Primary Examiner*—Chi H Pham
*Assistant Examiner*—Ahmed Elallam
(74) *Attorney, Agent, or Firm*—Finnegan, Henderson, Farabow, Garrett & Dunner LLP

(57) ABSTRACT

A method and system for switching the serving services of virtual private LAN is provided. When a fault occurs on a normal service transmission path, a PE device on the secondary path transmits a message including an information of the failure device on the normal service transmission path to the other PE devices on the path to indicate the path switching; the other PE devices replace the faulty PE device corresponding to the transmission path item in VPLS transmission table as the PE device on the secondary path according to the received message for indicating the path switching. Using the present invention, when an access device detects a fault, the VPLS service can switch to the secondary path immediately without affecting other services; because the VPLS messages do not need to be broadcasted during path switching, the network bandwidth will not be wasted.

20 Claims, 2 Drawing Sheets

U.S. PATENT DOCUMENTS

| | | | |
|---|---|---|---|
| 2003/0179700 A1 | | 9/2003 | Saleh et al. |
| 2003/0179701 A1 | | 9/2003 | Saleh et al. |
| 2004/0156313 A1 | * | 8/2004 | Hofmeister et al. .......... 370/229 |
| 2004/0174887 A1 | * | 9/2004 | Lee ........................ 370/395.53 |
| 2004/0233891 A1 | * | 11/2004 | Regan et al. ................. 370/351 |
| 2005/0036442 A1 | | 2/2005 | Saleh et al. |
| 2005/0088965 A1 | * | 4/2005 | Atlas et al. ................... 370/216 |
| 2005/0111351 A1 | * | 5/2005 | Shen .......................... 370/217 |
| 2005/0213513 A1 | * | 9/2005 | Ngo et al. .................... 370/254 |
| 2006/0187855 A1 | * | 8/2006 | Booth et al. ................. 370/254 |
| 2006/0291391 A1 | * | 12/2006 | Vasseur et al. ............... 370/235 |
| 2008/0291921 A1 | * | 11/2008 | Du et al. ................. 370/395.53 |
| 2008/0298379 A1 | * | 12/2008 | Ould-Brahim .............. 370/401 |

OTHER PUBLICATIONS

International Search Report from the Chinese Patent Office for International Application No. PCT/CN2006/001116.

Extended European Search Report for European Application No. 06742004.2 including supplementary European search report and European search opinion (Sep. 30, 2008).

Lasserre, et al., "Virtual Private LAN Services over MPLS", draft-ietf-l2vpn-vpls-ldp-07.txt, Internet Draft Document, pp. 1-25, (Jul. 1, 2005).

* cited by examiner

METHOD AND SYSTEM FOR SWITCHING SERVING SERVICES OF THE VIRTUAL PRIVATE LAN SERVICE

FIELD OF THE INVENTION

The present invention generally relates to the field of communications, and particularly, to a method and system for switching a Virtual Private LAN Service (VPLS) service.

BACKGROUND OF THE INVENTION

With the development of information technologies, technologies such as Ethernet, IP and Multi-Protocol Label Switching (MPLS) and the like have gradually developed and won more and more users. The Virtual Private LAN Service (VPLS) technology that incorporates the advantages of both Ethernet and IP/MPLS has become the focus of attention and has found increasing applications.

The VPLS is an increasingly mature two-layer Virtual Private LAN (VPN) technology, and has not only the same security, quality of service (QoS) guarantee, expandability, flexibility and manageability as the VPN, but also the ability to provide various access methods.

In practical applications, the VPLS presents a strict requirement on reliability, and access users generally need to have their provider edge (PE) devices dual-homed to two different PE devices. FIG. 1 is a schematic diagram illustrating a solution for VPLS reliability that is described in the VPLS protocol draft in Internet Engineering Task Force (IETF).

In FIG. 1, VPLS data messages are transmitted by a Maximum Transmission Unit-s (MTU-s) that connects Custom Edges (CEs) with each other, to PE1-rs via a primary Pseudo Wire (PW), and to PE2-rs. If a fault exists in the primary PW or in PE1-rs, VPLS data messages are switched by MTU-s to a secondary PW and transmitted by MTU-s to PE3-rs via the secondary PW, and to PE2-rs. In this way, VPLS data messages are guaranteed to be transmitted to two PE devices either via the primary PW or via the secondary PW, allowing MTU-s to access a VPLS service with a greatly improved reliability.

A method for switching a VPLS service to the secondary PW when a fault exists in the primary PW or in PE1-rs is as follows:

1. After having received VPLS data messages from MTU-s, PE3-rs determines that a fault exists either in the primary PW or in PE1-rs, because, under normal conditions, MTU-s transmits the VPLS data messages to PE1-rs, rather than PE3-rs.

2. PE3-rs transmits an address canceling message containing a MAC List TLV, to each of the other PE-rs, e.g. only PE2-rs in the network as shown in FIG. 1.

3. After having received the address canceling message sent by PE3-rs, each of the Other PE-rs empties its VPLS forwarding table, re-learns the VPLS forwarding table, and forwards a VPLS service according to the re-learned VPLS forwarding table.

The forwarding table on PE2-rs before the re-learning, for example, is shown as Table 1 below.

TABLE 1

| VPLS No. | MAC Address | Forwarding Path |
|---|---|---|
| 1 | 00e0-fcaa-00aa | PE1-rs |
| 1 | 00e0-fcaa-00bb | PE4-rs |

TABLE 1-continued

| VPLS No. | MAC Address | Forwarding Path |
|---|---|---|
| 1 | 00e0-fcaa-00cc | PE1-rs |
| ... | ... | ... |

After having received the address canceling message, PE2-rs empties the items in the forwarding table. The resulting table, for example, is shown as Table 2 below, with all of the items with VPLS No. 1 deleted.

TABLE 2

| VPLS No. | MAC Address | Forwarding Path |
|---|---|---|
| 2 | — | — |
| 3 | — | — |
| 4 | — | — |
| ... | ... | ... |

The re-learned forwarding table, for example, is shown as Table 3.

TABLE 3

| VPLS No. | MAC Address | Forwarding Path |
|---|---|---|
| 1 | 00e0-fcaa-00aa | PE3-rs |
| 1 | 00e0-fcaa-00bb | PE4-rs |
| 1 | 00e0-fcaa-00cc | PE3-rs |
| ... | ... | ... |

The result of relearning is that, according to Table 3, all of the messages on PE2-rs that need to be transmitted to MTU-s are transmitted to PE3-rs firstly.

The disadvantages of the above method for switching a VPLS service to the secondary PW are as follows.

1. Although the VPLS forwarding table can be updated by using the above method, the VPLS forwarding table has to be emptied before being re-learned. All of the VPLS service messages to be forwarded have to be broadcast before the re-learning of the VPLS forwarding table, thereby consuming network bandwidth and increasing processing payloads.

2. In the above method, other services between PE-rs unrelated to the faulty PW or PEs will be also affected. For example, if there is also PE4-rs in the above network, the services between PE2-rs and PE4-rs should not be affected by the services of MTU-s, and the VPLS forwarding table on PE4-rs should not be emptied before being re-learned.

3. In the above method, PE3-rs determines a fault condition according to the VPLS data messages received from MTU-s. If there are no VPLS data message from MTU-s during a certain period, PE3-rs will not know that a fault may have occurred, and thus PE2-rs will not update the VPLS forwarding table. As a result, the VPLS data messages on PE2-rs will be still transmitted to PE1-rs and thus will not be received by MTU-s.

SUMMARY OF THE INVENTION

The disclosure provides a method and system for switching a VPLS service so that the VPLS service can be rapidly switched to a secondary PW without affecting other services after an access device detects a fault condition.

The disclosure provides a method for switching a VPLS service includes:

A. after knowing that a fault exists in a primary Pseudo Wire (PW) for a VPLS service, transmitting, by a Provider Edge (PE) device on a secondary PW, a message containing faulty PE device information for instructing to perform PW switching, to the PE devices except for the faulty PE device in the network;

B. replacing, by the PE devices except for the faulty PE device in the network, the faulty PE device corresponding to at least one forwarding path item in a VPLS forwarding table with the PE device on the secondary PW according to the received message for instructing to perform PW switching.

Preferably, after an access device for the VPLS service detects a fault existing in the primary PW and when no VPLS data message are to be transmitted, in block A, the PE device on the secondary PW knows the fault existing in the primary PW for the VPLS service according to a fault report message received from the access device.

Preferably, the fault report message is an address canceling message or a virtual PW status message.

Preferably, after the access device for the VPLS service detects that the fault exists in the primary PW and when existing VPLS data messages are to be transmitted, in block A, the PE device on the secondary PW knows the fault existing in the primary PW for the VPLS service according to the VPLS data messages received from the access device.

Preferably, the faulty PE device information is a Type-Length Value (TLV) of the faulty PE device information.

Preferably, the TLV of the faulty PE device information is established according to secondary relationship-related basic data information preset within the PE device on the secondary PW.

Preferably, the secondary relationship-related basic data information comprises VPLS number, information on the access device, and information on PE devices on the primary PW.

Preferably, the TLV of the faulty PE device information comprises Path Vector TLV or Label Switching Router ID (LSR ID) of the PE device.

Preferably, the block B includes:

B1. determining, by the PE devices except for the faulty PE device in the network, the faulty PE device on the primary PW according to the TLV of the faulty PE device information contained in the received message for instructing to perform PW switching;

B2. replacing, by the PE devices except for the faulty PE device in the network, the forwarding path items of the faulty PE device in the VPLS forwarding table with forwarding path items of the PE device on the secondary PW.

Preferably, after the block B1, the block B further includes: determining, by the PE devices except for the faulty PE device in the network, whether there exists the forwarding path item of the faulty PE device in their own forwarding path items stored, block B2 is executed if there exists a fault.

Preferably, the message containing faulty PE device information for instructing to perform PW switching is an address canceling message containing the faulty PE device information or a fault switching notifying message containing the faulty PE device information.

Preferably, the method for switching a VPLS service is achieved by use of Label Distribution Protocol (LDP), Border Gateway Protocol (BGP) or Layer-2 Tunneling Protocol Version 3 (L2TPv3).

A system for switching a VPLS service including an access device and a PE device, further includes:

a fault detection module of the access device, adapted to detect whether a fault exists in a primary PW, and to notify a fault notifying module of a PE device on a secondary PW after detecting the fault;

the fault notifying module of the PE device on the secondary PW, adapted to instruct an address replacement module within the PE devices except for a faulty PE device in the network to perform replacement operations, by transmitting a message containing faulty PE device information for instructing to perform PW switching, to the PE devices except for the faulty PE device in the network according to the received notification;

the address replacement module of the PE devices except for the faulty PE device in the network, adapted to replace the faulty PE device corresponding to at least one forwarding path item in a VPLS forwarding table with the PE device on the secondary PW according to the received instruction to perform replacement operations.

Preferably, the PE devices except for the faulty PE device in the network further include:

an address determination module, adapted to receive the instructions to perform replacement operations, to determine whether there exists at least one forwarding path item that is the faulty PE device in a VPLS forwarding table of a local PE device, and to instruct the address replacement module to perform replacement operations if there exists a fault.

Preferably, the faulty PE device information is a TLV of the faulty PE device information.

Preferably, the TLV of the faulty PE device information is established according to secondary relationship-related basic data information preset within the Pt device on the secondary PW.

Preferably, the secondary relationship-related basic data information comprises VPLS number, information on the access device, and information on PE devices on the primary PW.

Preferably, the TLV of the faulty PE device information comprises Path Vector TLV or LSR ID of the PE device.

Preferably, the message containing faulty PE device information for instructing to perform PW switching is an address canceling message containing the faulty PE device information or a fault switching notifying message containing the faulty PE device information.

Preferably, the system for switching a VPLS service is achieved by use of LDP, BGP or L2TPv3.

It can be seen from the above that the disclosure has several advantages. Specifically, after detecting a fault condition, the access device may rapidly switch the VPLS service to the secondary PW by transmitting VPLS data messages, an address canceling message or a PW status message, so that all of the PE devices other than the faulty PE device in the network can update their VPLS forwarding table timely. All of the PE devices other than the faulty PE device in the network rapidly switch forwarding path items in their VPLS forwarding table to the secondary PW by replacing the forwarding path items, instead of emptying their forwarding table, so that those forwarding path items between other PE devices unrelated to the faulty PW will not be affected, thereby avoiding affecting other services; the VPLS data messages do not need to be broadcasted during PW switching, thereby avoiding wasting network bandwidth.

DETAILED DESCRIPTION OF THE EMBODIMENTS

The disclosure provides a method for switching a VPLS service. After detecting a fault condition, an access device may rapidly switch a VPLS service to a secondary PW by transmitting VPLS data messages, an address canceling message or a PW status message. The PE devices that have received an address canceling message simply replace their VPLS forwarding table, instead of emptying their VPLS forwarding table.

Figure 2:
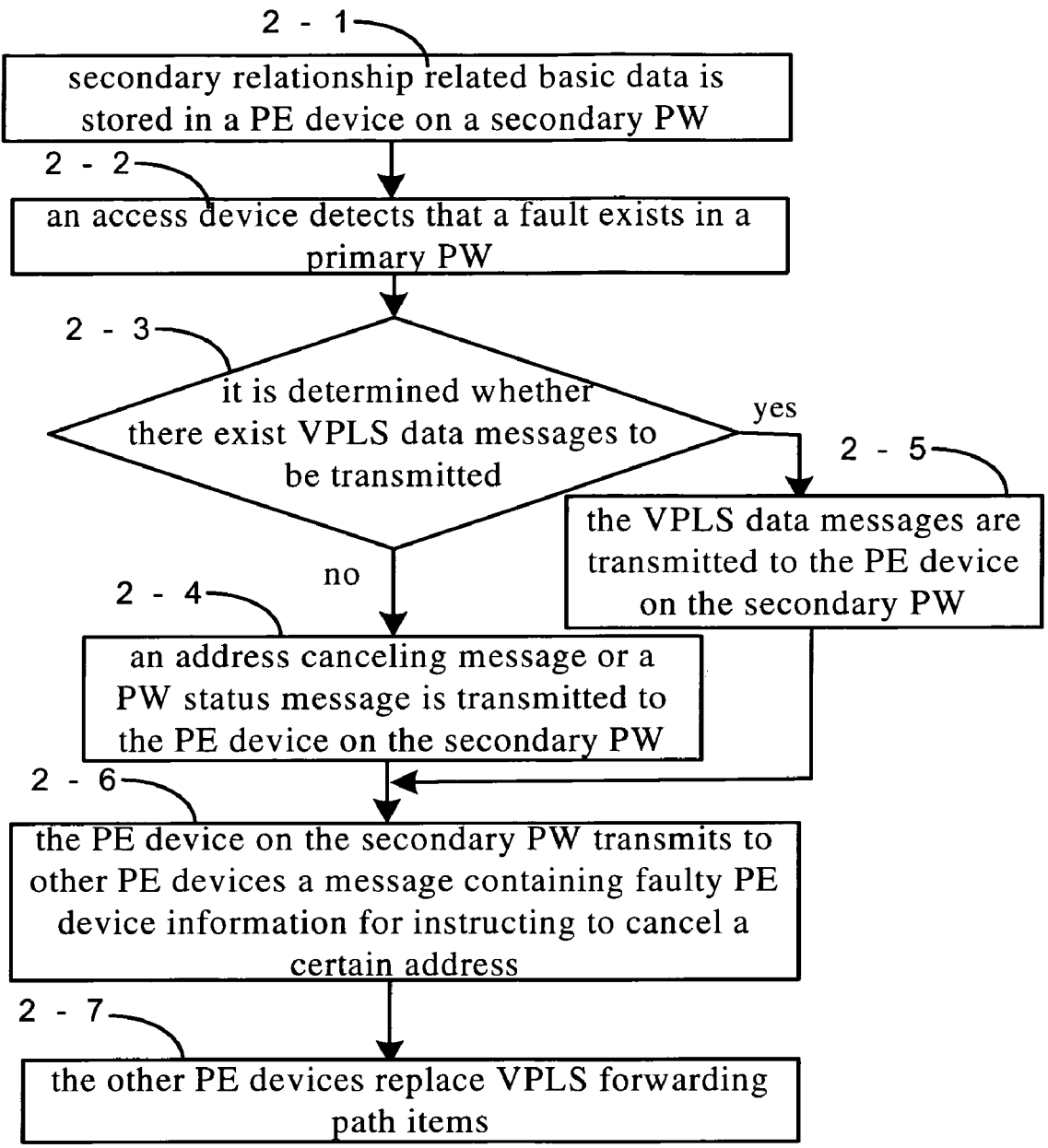
FIG. 2 is a flow diagram of a method according to an embodiment of the disclosure.

The disclosure is described in conjunction with the accompany drawings. FIG. 2 is a flow diagram of a method according to an embodiment of the disclosure.

In block 2-1, a secondary relationship-related basic data is stored in a PE device on a secondary PW.

In the method according to an embodiment of the disclosure, it is required to store the secondary relationship-related basic data information in the PE device on the secondary PW. The secondary relationship-related basic data information, which includes VPLS number, information on the access device, and information on PE devices on a primary PW, may be used to establish a TLV that describes the information on the faulty PE device on the primary PW.

Figure 1:
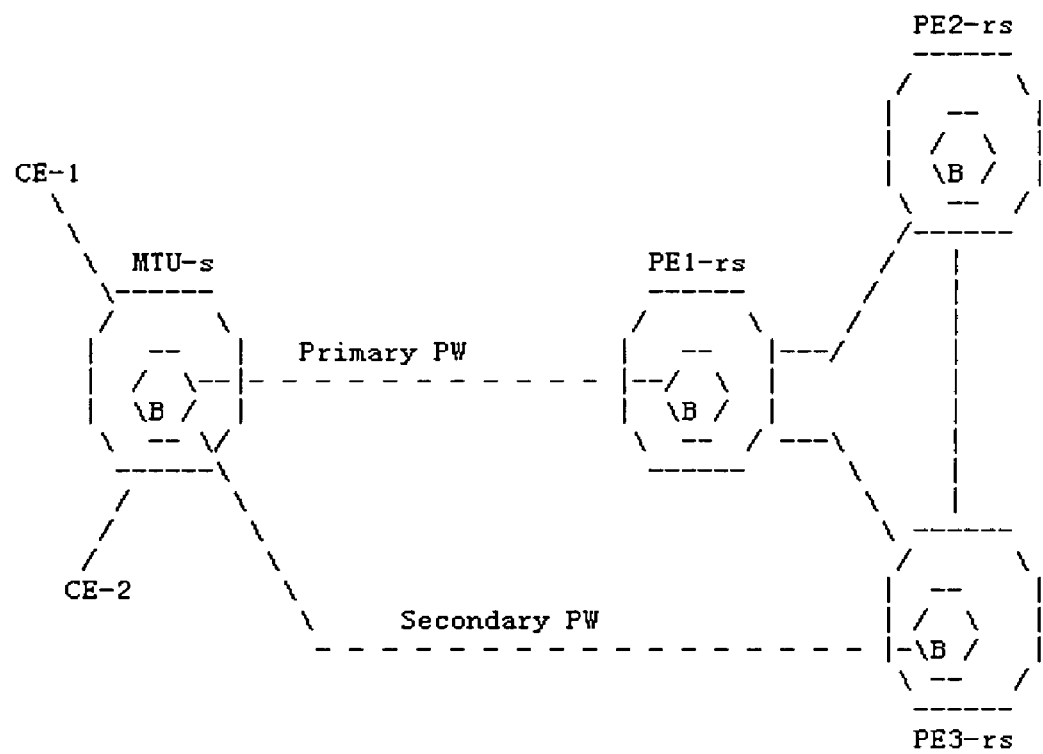
FIG. 1 is a schematic diagram illustrating a solution for VPLS reliability that is described in the VPLS protocol draft in IETF.

In the network shown in FIG. 1, for example, it is required to establish on PE3-rs the secondary relationship-related basic data information, including VPLS Number, information on MTU-s and information on PE1-rs.

In block 2-2: the access device detects whether a fault exists in the primary PW.

The access device frequently detects whether a fault exists in the primary PW for the VPLS service. If a fault exists in the primary PW, the access device switches the VPLS service to the secondary PW.

In the network shown in FIG. 1, for example, MTU-s frequently detect whether a fault exists in the primary PW or in PE1-rs. If there exists a fault, block 2-3 is executed; otherwise, messages in the primary PW for the VPLS service are transmitted.

In block 2-3, the access device determines whether there exist VPLS data messages to be currently transmitted.

After detecting that a fault exists in the primary PW, the access device determines whether there exist VPLS data messages to be currently transmitted. If there exist VPLS data to be currently transmitted, block 2-5 is executed; otherwise, block 2-4 is executed.

In the network shown in FIG. 1, for example, after detecting a fault in the primary PW or in PE1-rs, MTU-s determines whether there exist VPLS data messages to be currently transmitted to PE1-rs. If there exist VPLS data messages to be currently transmitted to PE1-rs, block 2-5 is executed; otherwise, block 2-4 is executed.

In block 2-4, an address canceling message or a PW status message is transmitted to the PE device on the secondary PW.

If there is no VPLS data message to be currently transmitted from the access device, the access device transmits to the PE device on the secondary PW a message reporting that a fault exists in the primary PW, such as an address canceling message containing the information on the PE device that is unable to forward the VPLS service due to the fault, or a PW status message.

In the network shown in FIG. 1, for example, once detecting that a fault exists in the primary PW or in PE1-rs, MTU-s transmits to PE3-rs an address canceling message containing the MAC List TLV and PE1-rs information TLV, wherein the PE1-rs information TLV may be in the form of Standard Path Vector TLV. Thereafter, block 2-6 is executed.

In block 2-5, the VPLS data messages are transmitted to the PE device on the secondary PW.

If there exists VPLS data messages to be currently transmitted from the access device, the access device transmits these VPLS data messages to the PE device on the secondary PW. After having received these VPLS data messages, the PE device on the secondary PW knows that a fault exists in the primary PW, because, under normal condition, these VPLS data messages would be transmitted to the PE device on the primary PW. Thereafter, block 2-6 is executed.

In block 2-6, the PE device on the secondary PW transmits to other PE devices an address canceling message containing faulty PE device information, i.e. a message for instructing to cancel a certain address.

After having received the address canceling message, the PW status message or the VPLS data messages from the access device, the PE device on the secondary PW knows that a fault exists in the primary PW and that the PE device on the primary PW is unable to forward the VPLS service, and then transmits to other PE devices an address canceling message containing the information on the faulty PE device on the primary PW.

In the network shown in FIG. 1, for example, PE3-rs transmits to other PE-rs a message for instructing to cancel a certain address, which contains a TLV that describes the information on PE1-rs in addition to the MAC List TLV. This TLV may be established according to the secondary relationship-related basic data stored in PE3-rs. This TLV may be in the form of Standard Path Vector TLV or otherwise defined, and may be described by the LSR ID of PE1-rs.

In block 2-7, the other PE devices replace VPLS forwarding path items.

After having received the message for instructing to cancel a certain address from the PE device on the secondary PW, the other PE devices know that a fault exists in the primary PW and, according to the TLV that describes the faulty PE device information contained in the received message for instructing to cancel a certain address, obtain the information on the PE device that is unable to forward the VPLS service, and then replace all of the forwarding path items that are the faulty PE device in the VPLS forwarding table with forwarding path items that are the PE device on the secondary PW.

It is appreciated that the above-mentioned message for instructing to cancel a certain address is essentially an address canceling message containing the information on the faulty PE device on the primary PW, and the address canceling message is essentially one type of path switching messages. In addition to the above-mentioned message for instructing to cancel a certain address, other messages such as a fault switching notifying message may also be used. In other words, in block 2-6, the PE device on the secondary PW transmits to the other PE devices a fault switching notifying message containing the information on the faulty PE device on the primary PW, which is one type of notifying messages. In any case, the message used in Block 2-6 is essentially a message containing the information on the faulty PE device on the primary PW for instructing to perform PW switching.

In the network shown in FIG. 1, for example, after having received the address canceling message containing the MAC List TLV and the PE1-rs information TLV from PE3-rs, PE2-rs knows that PE1-rs on the primary PW is unable to forward the VPLS service, and then replaces all of the forwarding path items that are PE1-rs in its VPLS forwarding table with forwarding path items that are PE3-rs.

A replacement process is shown in Table 3 and 4.

TABLE 3 forwarding table on PE2-rs before the replacement

| VPLS No. | MAC Address | Forwarding Path |
|---|---|---|
| 1 | 00e0-fcaa-00aa | PE1-rs |
| 1 | 00e0-fcaa-00bb | PE4-rs |
| 1 | 00e0-fcaa-00cc | PE1-rs |
| ... | ... | ... |

TABLE 4 forwarding table on PE2-rs after the replacement

| VPLS No. | MAC Address | Forwarding path | Modification |
|---|---|---|---|
| 1 | 00e0-fcaa-00aa | PE3-rs | Replacing PE1-rs with PE3-rs |
| 1 | 00e0-fcaa-00bb | PE4-rs | Unchanged |
| 1 | 00e0-fcaa-00cc | PE3-rs | Replacing PE1-rs with PE3-rs |
| ... | ... | ... | |

According to Table 4, all of the messages on PE2-rs that need to be transmitted to MTU-s are transmitted to PE3-rs firstly, and then forwarded by PE3-rs to MTU-s.

The above method may be achieved by use of LDP. Because the VPLS protocol may also be achieved by use of, for example, BGP and L2TPv3, if other protocol is employed, it is required to employ a new message in this protocol or to add faulty PE device information to an original message. Except for the protocol, other processes such as the process of replacing VPLS forwarding path items by other PEs after receiving the message, remain the same.

Embodiments of the disclosure further provide a system for switching a VPLS service including an access device and a PE device, further including:

a fault detection module within the access device, adapted to detect whether a fault exists in a primary PW, and to notify a fault notifying module within a PE device on a secondary PW after detecting the fault;

the fault notifying module within the PE device on the secondary PW, adapted to instruct an address replacement module within all of the PE devices other than a faulty PE device in the network to perform replacement operations, by transmitting a message containing faulty PE device information for instructing to perform PW switching, to all of the PE devices other than a faulty PE device in the network according to the received notification;

the address replacement module within all of the PE devices other than the faulty PE device in the network, adapted to replace the faulty PE device corresponding to at least one forwarding path item in a VPLS forwarding table with a PE device on the secondary PW according to the received instruction to perform replacement operations.

The faulty PE device information is a TLV of the faulty PE device information, and the TLV of the faulty PE device information is established according to secondary relationship-related basic data information preset within the PE device on the secondary PW. The secondary relationship-related basic data information includes VPLS number, information on the access device, and information on PE devices on the primary PW. The TLV of the faulty PE device information includes Path Vector TLV or LSR ID of the PE device.

All of the PE devices other than the faulty PE device in the network further include: an address determination module, adapted to receive the instructions to perform replacement operations, to determine whether there exists at least one forwarding path item that is the faulty PE device in a VPLS forwarding table within a local PE device, and to instruct the address replacement module to perform replacement operations if there exists a fault.

The message containing faulty PE device information for instructing to perform PW switching is an address canceling message containing the faulty PE device information or a fault switching notifying message containing the faulty PE device information.

The system for switching a VPLS service is achieved by means of LDP, BGP or L2TPv3.

In the above specification, the disclosure has been described in combination with specific exemplary embodiments thereof. It is obvious to those skilled in the art that various changes and modifications may be made to the disclosure without departing from the spirit and scope of the disclosure, and it is intended that the disclosure covers these changes and modifications falling within the scope of the disclosure as defined by the appended claims and their equivalents.

What is claimed is:

1. A method for switching a Virtual Private LAN Service (VPLS) service in a network, comprising:

A. after knowing that a fault exists in a primary Pseudo Wire (PW) linked to a faulty Provider Edge (PE) device, transmitting, by a PE device on a secondary PW, a message containing information regarding the faulty PE device for instructing to perform PW switching, to the PE devices except for the faulty PE device in the network; and B. replacing, by the PE devices except for the faulty PE device in the network, faulty PE device information corresponding to at least one forwarding path item in a VPLS forwarding table with PE device information on the secondary PW according to the received message for instructing to perform PW switching, wherein secondary relationship-related basic data is stored in the PE device on the secondary PW before the transmitting.

2. The method according to claim 1, wherein, after an access device for the VPLS service detects a fault existing in the primary PW and when no VPLS data message are to be transmitted, in step A, the PE device on the secondary PW knows the fault existing in the primary PW for the VPLS service according to a fault report message received from the access device.

3. The method according to claim 2, wherein the fault report message is an address canceling message or a virtual PW status message.

4. The method according to claim 1, wherein, after the access device for the VPLS service detects that the fault exists in the primary PW and when existing VPLS data messages are to be transmitted, in step A, the PE device on the secondary PW knows the fault existing in the primary PW for the VPLS service according to the VPLS data messages received from the access device.

5. The method according to claim 1, wherein the faulty PE device information is a Type-Length Value (TLV) of the faulty PE device information.

6. The method according to claim 5, wherein the TLV of the faulty PE device information is established according to secondary relationship-related basic data information preset within the PE device on the secondary PW.

7. The method according to claim 6, wherein the secondary relationship-related basic data information comprises VPLS number, information on the access device, and information on PE devices on the primary PW.

8. The method according to claim 5, wherein the TLV of the faulty PE device information comprises Path Vector TLV or Label Switching Router ID (LSR ID) of the PE device.

9. The method according to claim 5, wherein the step B comprises:
   B1. determining, by the PE devices except for the faulty PE device in the network, the faulty PE device on the primary PW according to the TLV of the faulty PE device information contained in the received message for instructing to perform PW switching; and
   B2. replacing, by the PE devices except for the faulty PE device in the network, the forwarding path items of the faulty PE device in the VPLS forwarding table with forwarding path items of the PE device on the secondary PW.

10. The method according to claim 9, wherein, the step B further comprises: determining, by the PE devices except for the faulty PE device in the network, whether there exists the forwarding path item of the faulty PE device in their own forwarding path items stored, step B2 is executed if there exists a fault.

11. The method according to claim 1, wherein the message containing faulty PE device information for instructing to perform PW switching is an address canceling message containing the faulty PE device information or a fault switching notifying message containing the faulty PE device information.

12. The method according to claim 1, wherein the method for switching a VPLS service is achieved by use of Label Distribution Protocol (LDP), Border Gateway Protocol (BGP) or Layer-2 Tunneling Protocol Version 3 (L2TPv3).

13. A system for switching a Virtual Private LAN Service (VPLS) service in a network, comprising:
   an access device including a fault detection module; and
   a Provider Edge (PE) device including a fault notifying module on a secondary Pseudo Wire (PW),
   wherein:
   the fault detection module of the access device is configured to detect whether a fault exists in a primary PW linked to a faulty PE device, and to notify the fault notifying module of the PE device on the secondary PW after detecting the fault;
   the fault notifying module of the PE device on the secondary PW is configured to instruct an address replacement module within the PE devices except for a faulty PE device in the network to perform replacement operations, by transmitting a message containing information regarding the faulty PE device for instructing to perform PW switching, to the PE devices except for the faulty PE device in the network according to the received notification;
   the address replacement module of the PE devices except for the faulty PE device in the network is configured to replace faulty PE device information corresponding to at least one forwarding path item in a VPLS forwarding table with PE device information on the secondary PW according to the received instruction to perform replacement operations; and
   secondary relationship-related basic data is stored in the PE device on the secondary PW before the fault detection.

14. The system according to claim 13, wherein the PE devices except for the faulty PE device in the network further comprises:
   an address determination module, configured to receive the instructions to perform replacement operations, to determine whether there exists at least one forwarding path item that is the faulty PE device in a VPLS forwarding table of a local PE device, and to instruct the address replacement module to perform replacement operations if there exists a fault.

15. The system according to claim 13, wherein the faulty PE device information is a TLV of the faulty PE device information.

16. The system according to claim 15, wherein the TLV of the faulty PE device information is established according to secondary relationship-related basic data information preset within the PE device on the secondary PW.

17. The system according to claim 16, wherein the secondary relationship-related basic data information comprises VPLS number, information on the access device, and information on PE devices on the primary PW.

18. The system according to claim 15, wherein the TLV of the faulty PE device information comprises Path Vector TLV or LSR ID of the PE device.

19. The system according to claim 13, wherein the message containing faulty PE device information for instructing to perform PW switching is an address canceling message containing the faulty PE device information or a fault switching notifying message containing the faulty PE device information.

20. The system according to claim 13, wherein the system for switching a VPLS service is achieved by use of LDP, BGP or L2TPv3.

* * * * *